United States Patent
Draxler et al.

(10) Patent No.: US 7,555,176 B2
(45) Date of Patent: Jun. 30, 2009

(54) METHOD FOR PRODUCING AN OPTICAL SPLITTER, AND OPTICAL SPLITTER

(75) Inventors: Franz Draxler, Dietramszell (DE);
Klaus Hartkorn, München (DE);
Markus Meinelt, Dietramszell (DE);
Angela Rief, Ismaning (DE); Wolfgang Schweiker, Weyarn (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 11/895,011

(22) Filed: Aug. 22, 2007

(65) Prior Publication Data
US 2009/0052842 A1   Feb. 26, 2009

(51) Int. Cl.
*G02B 6/26* (2006.01)
(52) U.S. Cl. .......................................... 385/14; 385/51
(58) Field of Classification Search .................... 385/14, 385/31, 38, 39, 45, 48, 50, 51
See application file for complete search history.

(56) References Cited

U.S. PATENT DOCUMENTS

| 4,953,936 A * | 9/1990 | Regener et al. ................ 385/49 |
| 7,002,136 B2 * | 2/2006 | Tanaka et al. .......... 250/227.11 |
| 2003/0091289 A1 * | 5/2003 | Saito et al. ..................... 385/49 |
| 2003/0169994 A1 * | 9/2003 | Steinberg et al. ............. 385/137 |

* cited by examiner

*Primary Examiner*—Sarah Song
(74) *Attorney, Agent, or Firm*—C. Keith Montgomery

(57) ABSTRACT

An optical splitter has an optical chip, in which a conductor track is arranged on a carrier substrate, wherein a conductor track section of the conductor track running from a first side of the chip branches into different conductor track sections which run to a second side of the chip via a plurality of branching nodes. An optical waveguide section of an optical waveguide is bonded at the first side of the chip by means of an adhesive material. Correspondingly, optical waveguide sections are bonded on the second side of the chip by means of an adhesive material. In order to reinforce the fixing, glass plates are arranged over and under the optical waveguides, said glass plates being bonded to the optical chip at the respective lateral surfaces.

13 Claims, 4 Drawing Sheets

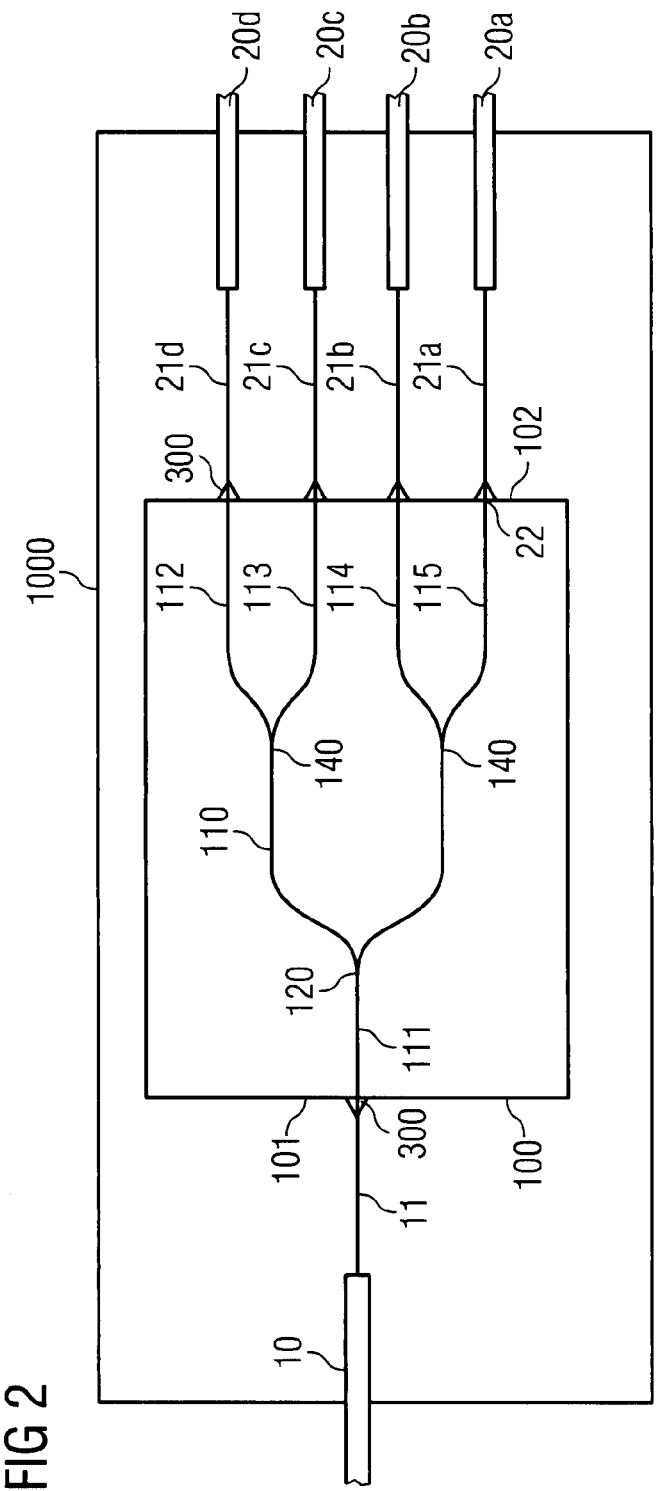
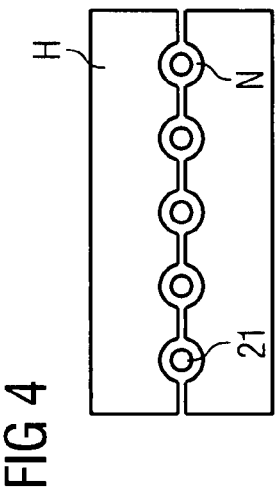

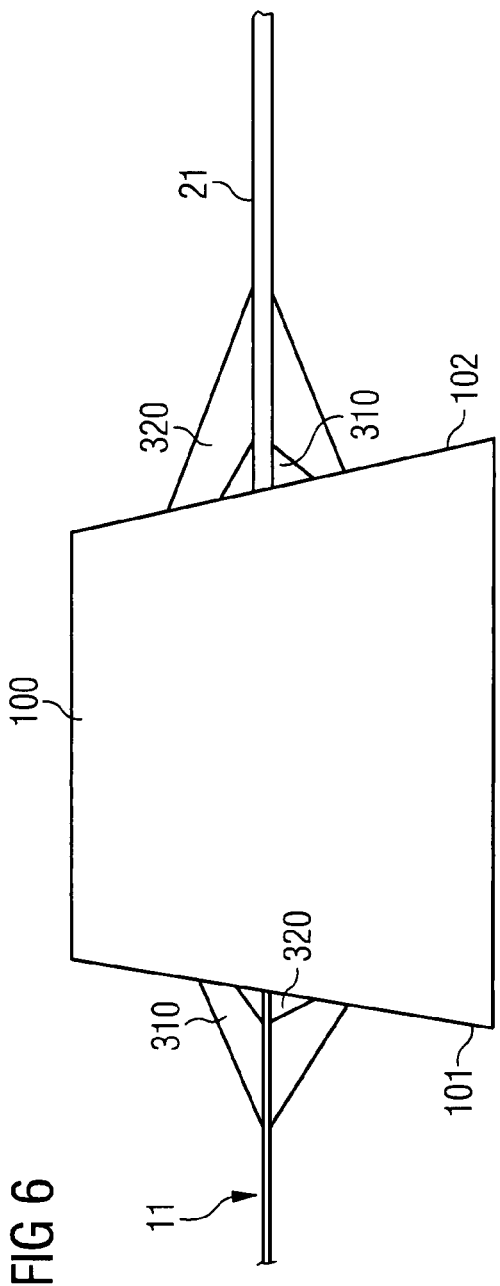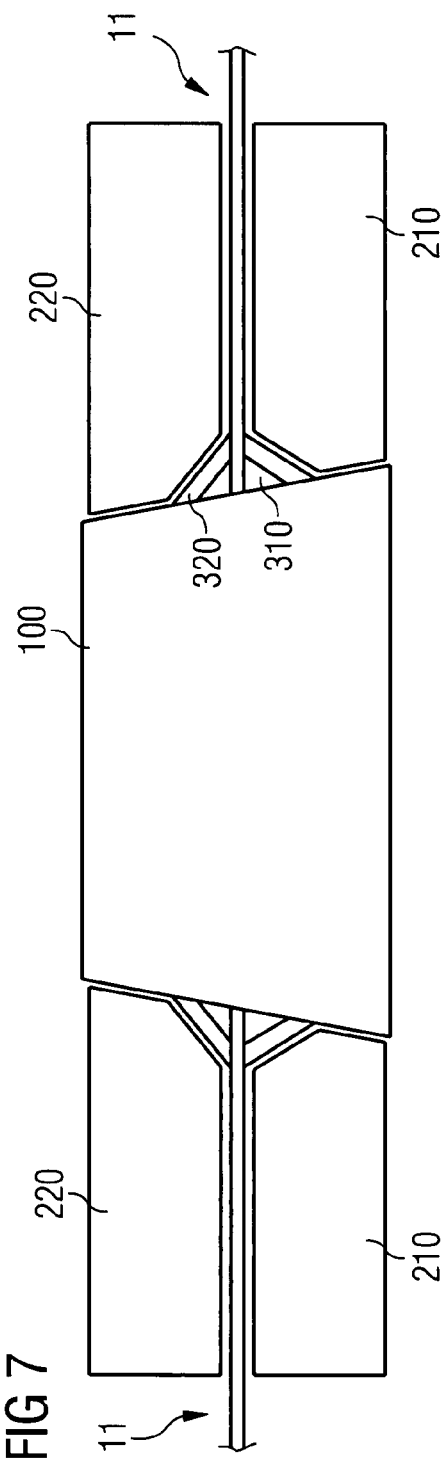

METHOD FOR PRODUCING AN OPTICAL SPLITTER, AND OPTICAL SPLITTER

The invention relates to a method for producing an optical splitter which distributes light from an optical waveguide arranged at an input side of the optical splitter between a plurality of optical waveguides arranged at an output side of the optical splitter. The invention furthermore relates to an optical splitter which distributes light from an optical waveguide arranged at an input side of the optical splitter between a plurality of optical waveguides arranged at an output side of the optical splitter.

FIG. 1A shows a cross section of an optical splitter. A single optical waveguide 10 is inserted into a housing 80 at one side. A plurality of optical waveguides 20 emerge toward the outside at another side of the housing. With the aid of the optical splitter, light that is fed to the splitter generally on the input side from the optical waveguide 10 is split between the various optical waveguides 20 fitted on the output side. The splitter can likewise be operated in the opposite direction. In this case, the input side of the splitter is that side at which the plurality of optical waveguides 20 are fitted, and the output side is that side at which the single optical waveguide 10 is arranged.

The optical waveguide 10 is surrounded with a reinforcing structure at its end. This can be realized e.g. in the form of a ferrule 40. The ferrule is formed for example as a small glass tube into which the fiber 10 is adhesively bonded. The reinforcing structure can also comprise two parts, e.g. a baseplate and a cover plate with groove. The reinforcing structure serves as a holding unit fixed at one side 31 of an optical chip 30. The reinforcing structure can be adhesively bonded onto the optical chip 30, for example.

The optical chip 30 has a carrier material, for example a substrate composed of glass or silicon, on which glass layers are deposited. The glass layers are formed for example from lightly doped quartz glass and act as optical waveguides. The optical waveguides can also be produced by other processes, e.g. diffusion of doping ions into the substrate material.

FIG. 1B shows a plan view of the optical splitter illustrated in cross section in FIG. 1A. The optical waveguides arranged on the carrier substrate form a conductor track having a plurality of branching nodes. Light that is fed into a conductor track section of the conductor track 33 for example from the optical waveguide 10 at the side 31 of the optical chip 30 is distributed between a plurality of conductor track sections of the conductor track downstream of the branching nodes.

At a side 32 of the optical chip, a so-called fiber array is fixed at the chip. The fiber array has a carrier substrate 50 and a V-groove lamina 60. The optical waveguides 20 are fixed on a top side of the carrier substrate 50. They are guided in grooves of the V-groove lamina 60 and are therefore aligned with the conductor track sections of the conductor track 33 that are arranged at the side 32 of the optical chip. A strain relief element 70 arranged at one side of the housing 90 protects the optical waveguides 20 against tensile loading and therefore against being torn away from the fiber array. The strain relief element can be formed for example as a rubber sleeve.

The production of an optical splitter as illustrated in FIGS. 1A and 1B is very complicated. Thus, it is necessary for example for the fiber ends of the optical waveguides 20 firstly to be cleaned, to be arranged in the grooves of the V-groove lamina, and to be adhesively bonded onto the carrier substrate. Furthermore, the fiber end of the optical waveguide 10 is cast into the reinforcing structure 40. In particular the fiber array, which is adhesively bonded onto the optical chip in order to align the individual optical waveguides of the plurality of optical waveguides 20 with the conductor track sections of the optical conductor track 33 at the output side 32 of the chip, is very cost-intensive.

A method for producing an optical splitter in which optical waveguides are fixed at an optical chip in a simple and reliable manner is specified below. According to an embodiment of the method for producing an optical splitter, a chip having a carrier substrate is to be provided, on which is arranged at least one optical conductor track, said at least one optical conductor track comprising a plurality of conductor track sections, wherein a first one of the conductor track sections running from a first side of the chip branches at least one branching point of the conductor track into at least two second conductor track sections which run to a second side of the chip. An optical waveguide section of a first optical waveguide is bonded onto the first conductor track section of the conductor track at the first side of the chip, wherein the optical waveguide section of the first optical waveguide is not arranged on a carrier substrate after bonding, and/or a plurality of respective optical waveguide sections of second optical waveguides are bonded onto a respective one of the second conductor track sections at the second side of the chip, wherein the optical waveguide sections of the second optical waveguides are not arranged on a carrier substrate after bonding.

According to another embodiment, the carrier substrate comprises a substrate material which is arranged for supporting the optical waveguides in a longitudinal direction of the optical waveguides. Consequently, in the method according to the invention, an optical waveguide section of a first optical waveguide is directly bonded onto the first conductor track section of the conductor track at the first side of the chip. Therefore, the optical waveguide section of the first optical waveguide is no longer cast into the reinforcing structure (ferrule). Likewise, it is also possible for respective optical waveguide sections of second optical waveguides to be bonded onto a respective one of the second conductor track sections directly at the second side of the chip. Consequently, the optical waveguide sections of the second optical waveguides no longer need to be arranged on a carrier substrate, which may be formed for example as part of a fiber array, and be bonded onto the chip with the fiber array.

In an further embodiment, the optical waveguide section of the first optical waveguide is adhesively bonded onto the first conductor track section of the conductor track and the plurality of respective optical waveguide sections of the second optical waveguides are adhesively bonded onto a respective one of the second conductor track sections. Since the fiber array, in particular, represents a not inconsiderable cost factor, and adhesively bonding the optical waveguide sections of the second optical waveguides on the fiber array represents a complicated production step, the coupling of the second optical waveguides to the chip is simplified by the method according to the invention.

According to another embodiment of the method, respective end surfaces of the optical waveguide sections of the first optical waveguide and/or respective end surfaces of the second optical waveguides are bonded by means of an adhesive material at respective end surfaces of the conductor track sections of the conductor track at the first and/or second side of the chip.

In a further embodiment of the method, a first layer of the adhesive material is applied laterally with respect to the respective end surfaces of the optical waveguide sections at the first and/or second side of the chip. The first layer of the adhesive material may contain an acrylate. The first layer of the adhesive material may also contain an epoxide. The applied adhesive material composed of acrylate or epoxide is preferably cured by means of UV radiation.

Another embodiment of the method provides for a second layer of the adhesive material to be applied over the first layer. In this case, the second layer of the adhesive material has a lower coefficient of thermal expansion than the first layer of the adhesive material. The applied second layer may comprise a glass-filled adhesive material.

In accordance with a further embodiment of the method, a first glass plate is arranged under the respective optical waveguide sections of the optical waveguides after bonding the respective optical waveguide sections of the optical waveguides onto the respective conductor track sections of the conductor track, said first glass plate being bonded onto the first and/or second side of the chip.

In accordance with a further feature of the method, a second glass plate is arranged over the respective optical waveguide sections of the optical waveguides after bonding the respective optical waveguide sections of the optical waveguides onto the respective conductor track sections of the conductor track, said second glass plate being bonded onto the first and/or second side of the chip.

The method may also provide for arranging the respective optical waveguide sections of the optical waveguides prior to bonding onto the respective conductor track sections of the conductor track in grooves of a holding device and aligning said optical waveguide sections with the respective conductor track sections at the first and/or second side of the chip by means of the holding device.

The respective optical waveguide sections of the optical waveguides are preferably cut at an angle of less than 15°, preferably of 8°.

In accordance with a further feature of the method, before bonding the optical waveguide sections of the optical waveguides onto respective conductor track sections of the conductor track, a coating of the optical waveguides is removed in the region of the respective optical waveguide sections of the optical waveguides.

In the following an embodiment of an optical splitter is specified in which optical waveguides are fixed at an optical chip in a simple and reliable manner. The optical splitter comprises a chip containing a carrier substrate, on which is arranged at least one optical conductor track, said at least one optical waveguide comprises a plurality of conductor track sections, wherein a first one of the conductor track sections running from a first side of the chip branches at least one branching point of the conductor track into at least two second conductor track sections which run to a second side of the chip. An optical waveguide section of a first optical waveguide is bonded onto the first conductor track section of the conductor track at the first side of the chip, wherein the optical waveguide section of the first optical waveguide is not arranged on a carrier substrate. A plurality of respective optical waveguide sections of second optical waveguides are bonded onto the conductor track sections at the second side of the chip, wherein the optical waveguide sections of the second optical waveguides are not arranged on a carrier substrate.

In accordance with another embodiment of the optical splitter, a first layer of an adhesive material is arranged at respective end surfaces of the optical waveguide sections. The first layer of the adhesive material can also be arranged laterally with respect to the respective end surfaces. In one preferred embodiment, the first layer of the adhesive material contains an acrylate or an epoxide.

In accordance with a further feature of the optical splitter, a second layer of the adhesive material is arranged over the first layer of the adhesive material. The adhesive material of the second layer is preferably filled with glass.

In another embodiment of the optical splitter, a surface at the first and/or second side of the chip and the respective end surfaces of the optical waveguide sections have an inclination of less than 15°, preferably of 8°.

The chip and the respective optical waveguide sections of the optical waveguides can be surrounded by a housing.

According to a further embodiment of an optical splitter the optical splitter comprises a chip containing a carrier substrate, on which is arranged at least one optical conductor track, said carrier substrate comprises a plurality of conductor track sections, wherein a first one of the conductor track sections running from a first side of the chip branches at least one branching point of the conductor track into at least two second conductor track sections which run to a second side of the chip. An optical waveguide section of a first optical waveguide is bonded onto the first conductor track section of the conductor track at the first side of the chip. A plurality of respective optical waveguide sections of second optical waveguides are bonded onto the conductor track sections at the second side of the chip. A first glass plate is bonded onto the first and/or second side of the chip, said first glass plate being arranged under the respective optical waveguide sections of the first optical waveguide and/or of the second optical waveguides.

In accordance with a further embodiment of the optical splitter, a second glass plate is bonded onto the first and/or second side of the chip, said second glass plate being arranged over the respective optical waveguide sections of the first optical waveguide and/or of the second optical waveguides.

In one preferred embodiment of the optical splitter, the first and/or second glass plate in each case has a cutout at its respective end surfaces at which it is bonded onto the first and/or second side of the chip. An adhesive material is arranged in the respective cutout of the first and/or second glass plate.

In accordance with a preferred embodiment of the optical splitter, a surface at the first and/or second side of the chip and the first and/or second glass plate have an inclination of less than 15°, preferably of 8°.

In accordance with another embodiment of the optical splitter, the chip and the respective optical waveguide sections of the optical waveguides are surrounded by a housing.

The invention is explained in more detail below with reference to Figures showing exemplary embodiments of the present invention. In the Figures:

FIG. 2 shows a plan view of a further embodiment of an optical splitter,

FIG. 3 shows a cross section through an optical waveguide,

FIG. 4 shows a holding device for aligning optical waveguide sections with conductor track sections of an optical chip, FIG. 6 shows a cross section through a further embodiment of an optical splitter, FIG. 7 shows a cross section through a further embodiment of an optical splitter.

Figure 1A:
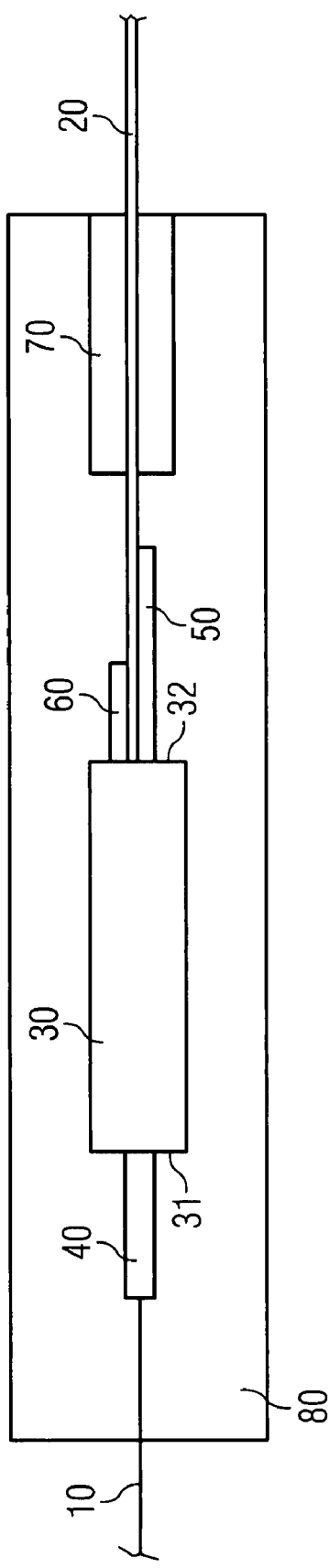
FIG. 1A shows a cross section of an optical splitter.

FIG. 2 shows a plan view of an optical chip 100, on which is applied a conductor track 110 having a plurality of conductor track sections 111, 112, . . . , 115. For fitting the conductor track 110, conductor tracks composed of lightly doped quartz glass are deposited on a carrier material formed for example from silicon or pure quartz glass. A conductor track section 111 running from a side 101 of the chip 100 branches at a branching point 120 and further branching points 130, 140 into conductor track sections 112, 113, 114 and 115 which run to a side 102 of the chip. The optical chip generally serves to distribute light that is fed into the conductor track section 111 on the side 101 of the chip between a plurality of optical waveguides that are to be fitted at the side 102 of the chip.

Likewise, the light can also be fed into the single optical waveguide 11 on the side 101 from the optical waveguides arranged at the side 102 via the conductor track 110.

Figure 1B:
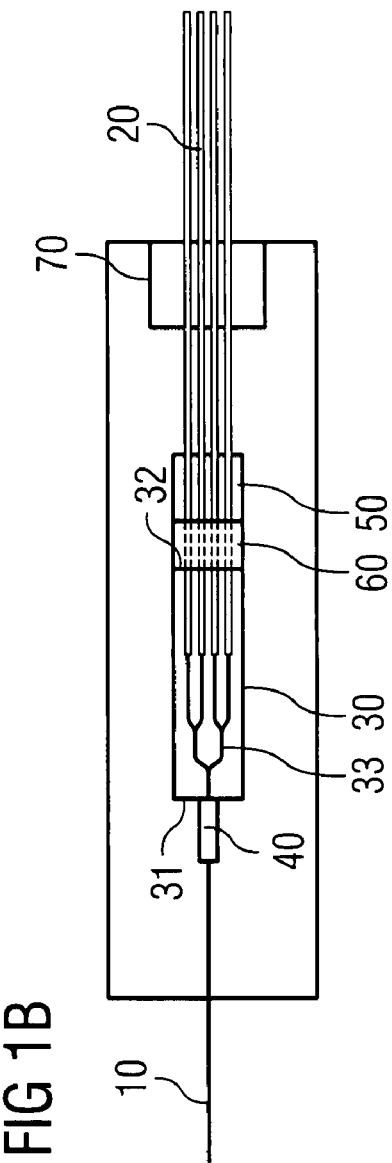
FIG. 1B shows a plan view of one embodiment of an optical splitter.

In contrast to the embodiment of an optical splitter as shown in FIGS. 1A and 1B, in the embodiment illustrated in FIG. 2, the optical waveguide 10 and the plurality of optical waveguides 20 are adhesively bonded directly onto the two sides of the chip. Consequently, the optical waveguide 10 is no longer surrounded by the ferrule 40. Likewise, after adhesive bonding the plurality of optical waveguides 20 are not held on the carrier substrate 50 arranged in the longitudinal direction of the optical waveguides or are no longer guided in grooves of the V-groove lamina 60 that is adhesively bonded to the carrier substrate in the embodiment of FIGS. 1A and 1B.

FIG. 3 shows a cross section through one of the optical waveguides 10 or 20. The optical waveguides respectively have a core 11, 21 in their center, light being guided in said core. The core 11 or 21 is surrounded by a cladding material having a lower refractive index than the core and by an outer coating B. After the removal of the outer coating B, the optical waveguide section 11 representing the core region of the optical waveguide 10 is fitted at the side 101 of the chip 30 and/or the optical waveguide sections 21 representing the core regions of the optical waveguides 20 are adhesively bonded onto the side 102 of the optical chip.

In order to align the optical waveguide sections 11 and/or 21 with the conductor track sections 111 and/or 112, . . . , 115 of the optical chip, the optical waveguide sections are firstly arranged in a holding device. FIG. 4 shows a holding device H for aligning the optical waveguide sections, for example for aligning the optical waveguide sections 21a, . . . , 21d with the conductor track sections 112, . . . , 115 of the conductor track 110. The holding device comprises a plurality of cutouts N, in which the optical waveguide sections 21a, . . . , 21d are arranged. An adhesive material 300 is applied at the side 101, in a region at which the conductor track section 111 is arranged, and/or at the side 102, in regions at which the conductor track sections 112, . . . , 115 are arranged. The adhesive material 300 can be for example a UV-curing acrylate or a UV-curing epoxide. The entire arrangement can be surrounded by a housing 1000 for protection against tearing away of the optical waveguide sections 11 and 21a, . . . , 21d.

Figure 5:
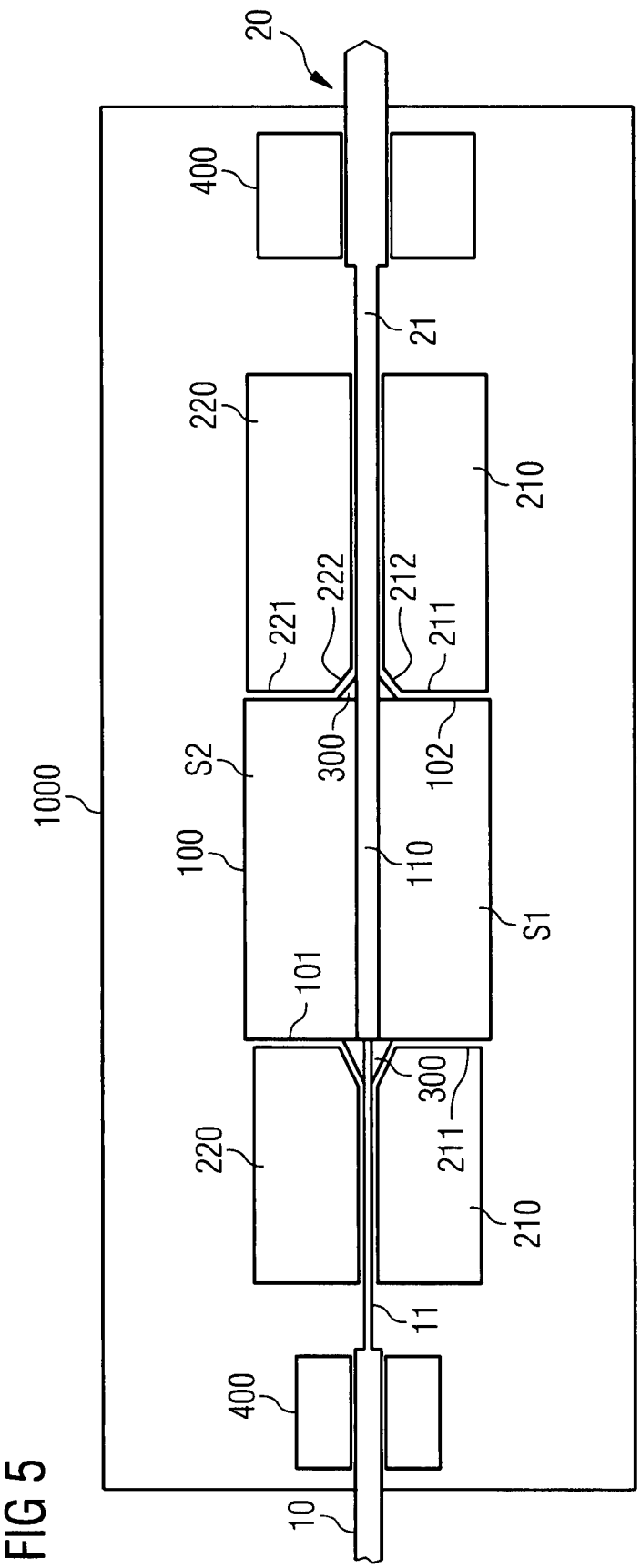
FIG. 5 shows a cross section through a further embodiment of an optical splitter.

FIG. 5 shows a cross section through an embodiment of an optical splitter. The optical chip 100 is formed as a multilayer substrate and has a carrier layer S1, on which glass layers 110 are deposited as an optical conductor track. The carrier layer S1 can be formed as pure quartz glass or as a silicon substrate. The conductor track sections of the conductor track 110 are surrounded by a protective layer (cladding), which is additionally protected by a cover plate S2 bonded on the carrier layer S1. The optical waveguide section 11 of the optical waveguide 10 is bonded onto the side 101 by means of the adhesive material 300. The optical waveguide sections 21a, . . . , 21d of the optical waveguides 20 are bonded onto the side 102 of the chip.

After the adhesive bonding of the fibers, in accordance with the embodiment shown in FIG. 5, a glass plate 210 is positioned below the optical waveguide sections 11 and/or 21. The glass plate 210 is bonded at its lateral surface 211 onto the side 101 and/or the side 102 of the optical chip 100. Afterward, a further glass plate 220 is arranged above the optical waveguide sections 11 and/or 21 and bonded by its respective lateral surfaces 221 onto the side 101 and/or the side 102 of the optical chip 100.

Glass plates 210 and 220 are preferably adhesively bonded onto the lateral surfaces at the output side 102 of the optical chip. The glass plates afford protection in order that the fibers do not tear away from the lateral surfaces of the chip 100. Arranging the optical waveguide sections in a fiber array and adhesively bonding the fiber array onto the side 102 of the chip are therefore obviated. The optical waveguide section 11 can furthermore be fixed by means of a ferrule at the side 101 of the chip. However, it can likewise, as shown in FIG. 5, be adhesively bonded directly onto the side of the chip and be protected against tearing away by means of the two glass plates 210 and 220.

The glass plates 210 and 220 in each case have cutouts 212 and 222, respectively. The cutouts afford space in order that the adhesive material 300 can take shape conically. As a result, the adhesive material runs laterally with respect to the optical waveguide sections 11 and 21 and thus affords a good retention.

For further protection, the entire arrangement is embedded in a housing 1000 composed of a plastic or metal material. As further protection against tensile loading, the optical waveguide 10 and the optical waveguides 20 are surrounded by a reinforcement 400, for example a sleeve composed of a material composed of a rubber.

FIG. 6 shows a further embodiment of an optical splitter. The optical waveguide sections 11 and/or 21 are adhesively bonded onto the optical chip 100 at a side 101 and/or a side 102. The adhesive material 300 has two layers 310 and 320. The layer 310 is formed for example as a UV-curing acrylate or as a UV-curing epoxide. The adhesive material of the layer 320 has a lower coefficient of thermal expansion than the adhesive material of the layer 310. By way of example, an adhesive highly filled with glass can be used as adhesive material for the layer 320. As a result, the layer 320 has a lower thermal expansion factor than the layer 310 and is adapted to the expansion factor of the glass layers of the optical chip 100. This prevents the optical waveguide sections 11 and/or 21 from tearing away from the chip in the event of heating or cooling of the optical splitter.

Furthermore, in the embodiment of the optical splitter that is shown in FIG. 6, the side 101 and the side 102 are cut at an angle that is less than 15° and is preferably 8°. This avoids back-reflections at the transition between glass and adhesive. Light is thus prevented from being coupled back after reflection into the optical waveguide 10 and the optical waveguides 20 and disturbing a transmitter or receiver. Likewise, the fibers 11 and 12 also have to be cut at a corresponding angle. A laser is preferably used for cutting the optical waveguide sections 11 and 21 at the angle.

FIG. 7 shows a further embodiment of an optical splitter. In this embodiment, the optical chip has beveled input and output lateral surfaces which are cut at an angle of less than 15°, preferably at an angle of 8°. The optical waveguide sections 11 and 21 are fixed by an adhesive material 300 at the input and output sides of the optical chip. The fibers 11 and 12 are furthermore arranged between two glass plates 210 and 220, which act as additional protection. The glass plates in each case have cutouts at their end surfaces, the adhesive material being arranged in said cutouts.

The described method in which fiber ends of optical waveguides are adhesively bonded directly onto an optical splitter can be applied to all devices in which an optical waveguide section of an optical waveguide has to be fixed at an optical chip. Arrangements of this type occur for example in an AWG (Arrayed Waveguide Grating Chip) or a planar VOA (Variable Optical Attenuator).

The AWG is a multiplexer/demultiplexer for wavelength division multiplexing. As in a splitter, in AWGs as well the light from an input fiber is distributed between a plurality of output fibers, or vice versa. However, in contrast to the splitter, only light having a specific wavelength is transmitted to a specific output fiber, such that the light is split in wavelength-dependent fashion. Typical configurations are 32 channel, 40 channel, 64 channel, 80 channel AWGs. In VOA arrays, the light from a respective input fiber is transmitted to the corresponding output fiber in variably attenuated fashion. Typical configurations are 8 channel or 16 channel VOA arrays.

Furthermore, the method or the optical splitter can also be applied in hybrid applications or planar splitters that typically have a splitter ratio of 1×4, 1×8, 1×16, 1×32, 1×64, 2×8, 2×16, 2×32, 2×64, 2−1×16. Hybrid applications make use of integrated optical components in which a plurality of optical functionalities (e.g. splitter, AWG, VOA, monitor diodes) are integrated on an optical chip (PLC—Planar Lightwave Circuit). Possible embodiments are V-MUX or OADM components. In a V-MUX component, an AWG together with a VOA array are integrated on an optical chip. The AWG functionality is in this case extended by the possibility of being able to individually attenuate each channel. In an OADM component (Optical Add-Drop Multiplexer) AWGs are integrated with optical switches.

LIST OF REFERENCE SYMBOLS

10 Optical waveguide
20 Optical waveguide
30 Chip
31 First side of the chip
32 Second side of the chip
40 Ferrule
50 Fiber array
60 V-groove lamina
70 Mount
80 Housing
100 Optical chip
101 First side of the chip
102 Second side of the chip
110 Conductor track
111, . . . , 115 Conductor track section
300 Adhesive material
210, 220 Glass plates
400 Holding device
11 Optical waveguide section
21 Optical waveguide section
B Coating
S Layer sequence

The invention claimed is:

1. A method for producing an optical splitter, comprising the following steps:
providing a chip having a carrier substrate, on which is arranged at least one optical conductor track, said optical conductor track comprising a plurality of conductor track sections, wherein a first one of the conductor track sections running from a first side of the chip branches at least one branching point of the conductor track into at least two second conductor track sections which run to a second side of the chip,
bonding an optical waveguide section of a first optical waveguide onto the first conductor track section of the conductor track at the first side of the chip, wherein the optical waveguide section of the first optical waveguide is not arranged on a carrier substrate after the bonding;
bonding a plurality of respective optical waveguide sections of second optical waveguides onto a respective one of the second conductor track sections at the second side of the chip, wherein the optical waveguide sections of the second optical waveguides are free of a carrier substrate after the bonding; and
arranging a first glass plate under the respective optical waveguide sections of the optical waveguides after bonding the respective optical waveguide sections of the optical waveguides onto the respective conductor track sections of the conductor track, wherein the first glass plate is bonded onto at least one of the first side of the chip and the second side of the chip.

2. The method as claimed in claim 1, comprising:
bonding respective end surfaces of the optical waveguide sections of at least one of the first optical waveguide and the second optical waveguides by means of an adhesive material onto the respective conductor track sections of the conductor track.

3. The method as claimed in claim 2, comprising:
applying a first layer of the adhesive material laterally with respect to the respective end surfaces of the optical waveguide sections at least one of the first side of the chip and the second side of the chip.

4. The method as claimed in claim 3, comprising:
applying the first layer of the adhesive material containing an acrylate.

5. The method as claimed in claim 3, comprising:
applying the first layer of the adhesive material containing an epoxide.

6. The method as claimed in claim 3, comprising:
curing the applied adhesive material containing at least one of acrylate and epoxide by means of UV radiation.

7. The method as claimed in claim 3, comprising:
applying a second layer of the adhesive material over the first layer.

8. The method as claimed in claim 7, comprising:
applying the second layer of the adhesive material having a lower coefficient of thermal expansion than the first layer.

9. The method as claimed in claim 8, comprising:
applying the second layer containing a glass-filled adhesive material.

10. The method as claimed in claim 1, comprising:
arranging a second glass plate over the respective optical waveguide sections of the optical waveguides after bonding the respective optical waveguide sections of the optical waveguides onto the respective conductor track sections of the conductor track, wherein the second glass plate is bonded onto at least one of the first side of the chip and the second side of the chip.

11. The method as claimed in claim 1, comprising:
arranging the respective optical waveguide sections of the optical waveguides prior to bonding onto the respective conductor track sections of the conductor track in grooves of a holding device and aligning the respective optical waveguide sections of the optical waveguides with the respective conductor track sections at least one of the first side of the chip and the second side of the chip by means of the holding device.

12. The method as claimed in claim 1, comprising:
cuffing the respective optical waveguide sections of the optical waveguides at an angle of less than 15 degrees.

13. The method as claimed in claim 1, comprising:
removing a coating of the optical waveguides in the region of the respective optical waveguide sections of the optical waveguides before bonding the optical waveguide sections of the optical waveguides onto the respective conductor track sections of the conductor track.

* * * * *